United States Patent Office 3,161,655
Patented Dec. 15, 1964

3,161,655
3-ALKYL-3-AMINO-6-HYDROXY-3,4-DIHYDRO-COUMARINS
Donald F. Reinhold, North Plainfield, N.J., John H. Markillie, Kalamazoo, Mich., and Meyer Sletzinger, North Plainfield, N.J., assignors to Merck & Co., Inc., Rahway, N.J., a corporation of New Jersey
No Drawing. Original application June 10, 1960, Ser. No. 35,132. Divided and this application Mar. 22, 1963, Ser. No. 267,351
2 Claims. (Cl. 260—343.2)

This application is a division of application Serial No. 35,132, filed June 10, 1960, now abandoned.

This invention relates to derivatives of phenylalanine and to processes for preparing the same.

The novel compounds of the present invention having anti-hypertensive activity have the general formula:

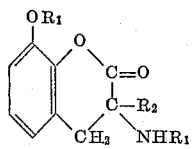

where $R_1$ is selected from the group consisting of hydrogen and lower alkanoyl radicals and $R_2$ is a straight chain lower alkyl radical containing from one to about four carbon atoms. Also included in the present invention are the non-toxic acid addition salts of the above compounds wherein $R_3$ is hydrogen. Preferred acid addition salts are those of non-toxic mineral acids such as hydrochloric acid, hydrobromic acid and sulfuric acid.

The compound 3-methyl-3-amino-6-hydroxy-3,4-dihydrocoumarin has greater activity in the treatment of hypertension than the previously known α-methyl-β-(3,4-dihydroxyphenyl)alanine disclosed in United States Patent 2,868,818, and accordingly is used in smaller dosage. Other compounds of the present invention are likewise highly active.

The compounds of the present invention are effective in the treatment of hypertension when administered orally in a daily dosage of about 0.15 to about 6 grams per day, preferably subdivided throughout the day. The preferred dosage range is from about 0.3 to about 3 grams per day. These compounds may be administered in gelatin capsules containing about 0.1 to about 0.5 gram of active ingredients or in tablets containing from about 0.1 to about 0.5 gram of active ingredients plus conventional excipients such as corn starch, lactose, magnesium stearate as a lubricating agent, flavoring agents and the like. These compounds may also be administered orally as an aqueous suspension. Alternatively the compounds of the present invention may be administered parenterally in sterile solution in suitable solvents, such as water, in the daily amounts of about 0.1 to about 2 grams per day, preferably subdivided throughout the day.

A further advantage of the compounds of this invention is the low incidence of side effects. One side effect which has been observed in previously known hypertensive agents is the tendncy to cause drowsiness. This is attributable to lowering of the norepinephrine level in the brain. The compound α-methyl-β-(2,3-dihydroxyphenyl)alanine causes only a very slight diminution in the brain norepinephrine level, and therefore causes virtually no drowsines.

The preparation of compounds of the present invention may be illustrated by the preparation of 3-amino-3-methyl-8-hydroxy-3,4-dihydrocoumarin from 2,3-dimethoxybenzaldehyde according to the flow sheet given below.

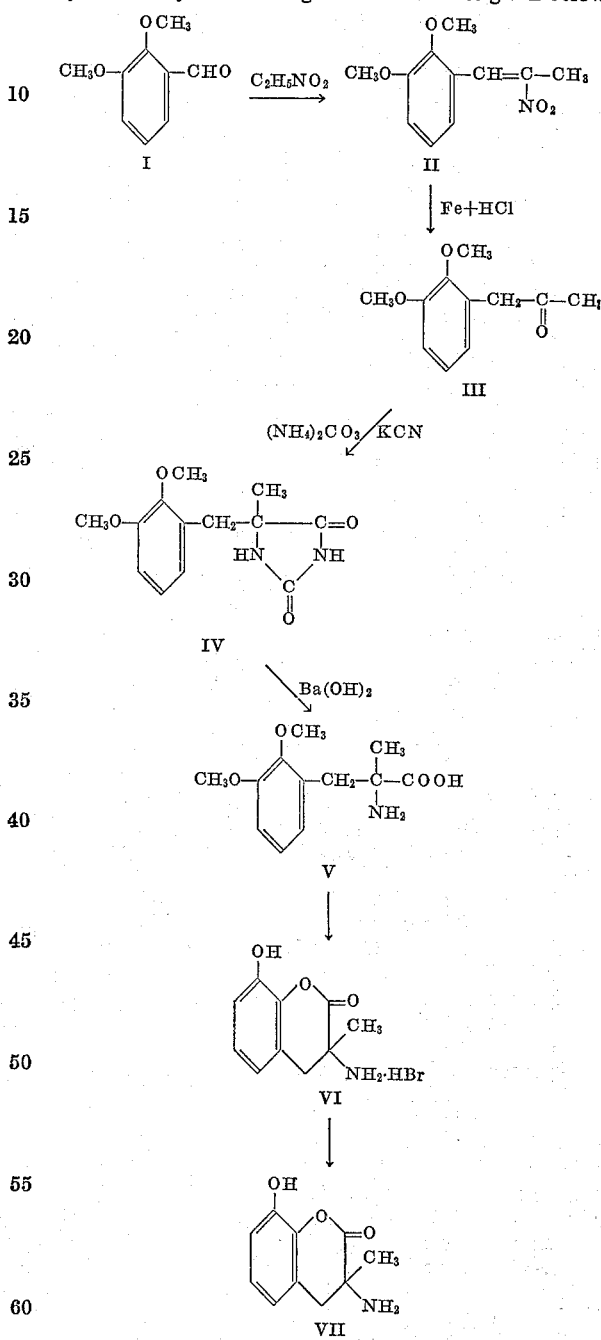

The compound 2,3-dimethoxybenzaldehyde (I) is reacted with nitroethane in the presence of a base such as n-butylamine in an inert organic solvent such as toluene or benzene under reflux or other elevated temperature conditions, thereby producing 1-(2-nitropropenyl)-2,3-dimethoxybenzene (II). This compounds is reacted with a reducing agent, preferably iron in an acidic medium such as aqueous hydrochloric acid, which results in the formation of 1 - (2,3 - dimethoxyphenyl) - 2 - propanone (III).

Reaction of 1 - (2,3-dimethoxyphenyl)-2-propanone (III) with ammonium carbonate and a water-soluble cyanide salt such as potassium cyanide, sodium cyanide, or ammonium cyanide in an aqueous medium results in the formation of 5-methyl-5-(2,3-dimethoxybenzyl) hydantoin (IV). This reaction may be carried out either at room temperature or at an elevated temperature. The reaction requires about 3 to 4 days at room temperature and about 12 to 24 hours at temperatures in the range of 50–60° C.

The 5-methyl-5-(2,3-dimethoxybenzyl)hydantoin can be converted to 3-amino-3-methyl-8-hydroxy-3,4-dihydrocoumarin (VII) by a sequence of reactions in which $\alpha$-methyl-$\beta$-(2,3-dimethoxyphenyl)alanine and a mixture of acid addition salts consisting primarily of 3-amino-3-methyl - 8 - hydroxy-3,4-dihydrocoumarin hydrobromide (VI) and a minor amount of $\alpha$-methyl-$\beta$-(2,3-dihydroxyphenyl)alanine hydrobromide are formed as intermediates.

Reaction of 5-methyl-5-(2,3-dimethoxybenzyl)-hydantoin (IV) with a base such as barium hydroxide, calcium hydroxide, or sodium hydroxide in an aqueous medium at elevated temperature, as for example at atmospheric pressure and reflux temperature (about 100° C.) or in a bomb under pressure at about 150° C., results in conversion of the hydantoin to $\alpha$-methyl-$\beta$-(2,3-dimethoxyphenyl)alanine (V). Where barium hydroxide or calcium hydroxide is used as a base, the alkaline earth metal ion in solution can be precipitated as the sulfate or carbonate, and thereafter the product can be recovered from the aqueous solution by evaporation. Other methods of separating of the product from solution will be obvious to those skilled in the art.

Hydrolysis of $\alpha$-methyl-$\beta$-(2,3-dimethoxyphenyl)-alanine (V) can be accomplished with a concentrated aqueous solution of a strong mineral acid such as hydrobromic acid or hydrochloric acid at elevated temperature of about 90° C. or higher. A preferred acid is hydrobromic acid having a concentration of about 35 percent to about 55 percent. Excellent results are obtained using 48 percent aqueous hydrobromic acid at the reflux temperature of 126° C. The hydrolysis product under these conditions is a mixture in which the principal product is 3-amino-3-methyl - 8 - hydroxy-3,4-dihydrocoumarin hydrobromide (VI). This compound is the delta-lactone of $\alpha$-methyl-$\beta$-(2,3-dihydroxyphenyl)alanine hydrobromide, which is formed in minor amounts. This reaction mixture can be separated into its components by contact with acetone, in which $\alpha$-methyl-$\beta$-(2,3-dihydroxyphenyl)alanine hydrobromide is soluble and 3-amino-3-methyl-8-hydroxy-3,4-dihydrocoumarin hydrobromide is insoluble.

The mixture of $\alpha$-methyl-$\beta$-(2,3-dihydroxyphenyl)-alanine hydrobromide and 3-amino-3-methyl-8-hydroxy-3,4-dihydrocoumarin hydrobromide (VI) can be converted to substantially pure $\alpha$-methyl-$\beta$-(2,3-dihydroxyphenyl)alanine by reaction with water followed by reaction with an aqueous solution of a base such as ammonia or sodium bicarbonate, or a weakly basic anion exchange resin for a substantial length of time sufficient for hydrolysis of the 3-amino-3-methyl-8-hydroxy 3,4-dihydrocoumarin hydrobromide (for example, one hour or longer). Where the desired product is 3-amino-3-methyl-8-hydroxy-3,4-dihydrocoumarin (VII), the hydrobromide (VI) is neutralized to pH 6 to 8 with a weak base such as sodium bicarbonate or ammonium hydroxide, and the precipitate is immediately filtered. Alternatively, the neutralization can be carried out in a non-aqueous organic solvent, such as methylene chloride or ethanol.

Acetylation of $\alpha$-methyl-$\beta$-(2,3-dihydroxyphenyl)alanine, or the hydrobromide thereof under conventional conditions, e.g., using acetic anhydride in the presence of a tertiary amine base such as pyridine at elevated temperature, affords a mixture of N-acetyl-$\alpha$-methyl-$\beta$-(2,3-diacetoxyphenyl)alanine and 3 - acetamido - 3 - methyl-8-acetoxy-3,4-dihydrocoumarin as shown below.

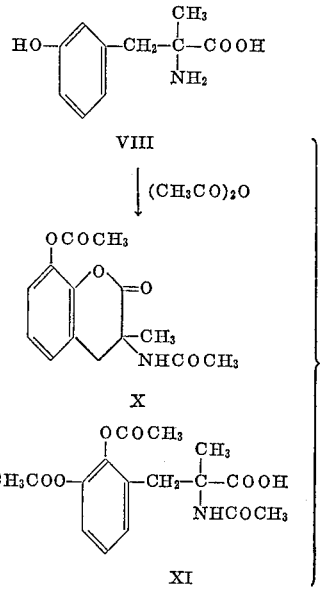

These compounds can be separated by fractional crystallization from a solvent such as isopropanol, ethanol, or the like. Acylation can also be accomplished using other anhydrides of lower aliphatic carboxylic acids, e.g., propionic anhydride and butyric anhydride.

The methods for preparing 3-methyl-3-amino-8-hydroxy-3,4-dihydrocoumarin and derivatives thereof described above can also be used for preparing homologs such as 3-ethyl-3-amino-8-hydroxy-3,4-dihydrocoumarin, 3 - propyl - 3 - amino - 8 - hydroxy - 3,4 - dihydrocoumarin, 3 - butyl - 3 - amino - 8 - hydroxy - 3,4 - dihydrocoumarin and their derivatives. These compounds can be prepared by reacting an aldehyde having the general formula:

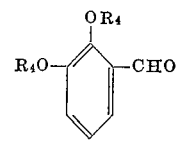

where $R_4$ is a lower alkyl radical, with a nitroalkane having the general formula:

$$R_2CH_2NO_2$$

such as 1-nitropropane or 1-nitrobutane under the conditions indicated for the reaction of 2,3-dimethoxybenzaldehyde. The product thus obtained has the general formula:

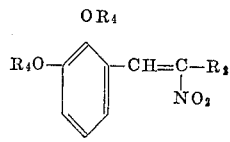

This compound is reacted with iron and hydrochloric acid as previously described to form a ketone having the general formula:

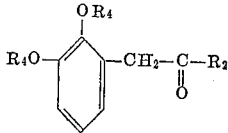

The ketone is reacted with ammonium carbonate and a water-soluble cyanide salt in an aqueous medium to form a hydantoin having the general formula:

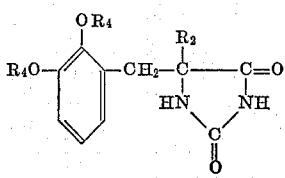

This hydantoin is hydrolyzed by reaction with a base such as barium hydroxide to form an α-(lower alkyl)-β-(2,3-dihydroxyphenyl)alanine having the general formula:

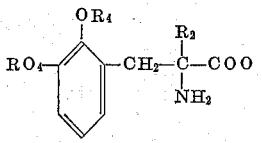

This compound is hydrolyzed with a concentrated solution of a strong mineral acid, preferably 48 percent hydrobromic acid and alternatively another acid such as concentrated hydrochloric acid, to produce a mixture of acid addition salts having the formulas:

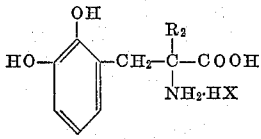

and

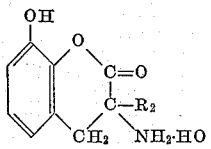

where X is as heretofore defined. Rapid neutralization of a lactone acid addition salt with an aqueous base such as ammonia yields predominantly a lactone having the formula:

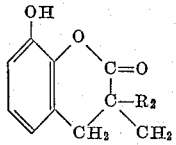

These lactones, having the formula:

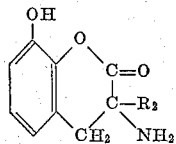

as well as the non-toxic acid addition salts thereof, are active as anti-hypertensive agents.

Acylated derivatives having the formula:

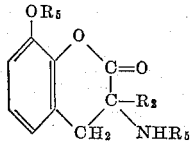

where $R_5$ is a lower alkanoyl radical, can be prepared by reaction of an α-(lower alkyl)-β-(2,3-dihydroxyphenyl)-alanine or an acid addition salt thereof, with an acid anhydride such as acetic anhydride or propionic anhydride in the presence of a base such as sodium hydroxide or pyridine. These compounds have anti-hypertensive activity.

This invention will now be described in detail with reference to the examples which follow.

EXAMPLE 1

1-(2-Nitro-1-Propenyl)-2,3-Dimethoxybenzene

A mixture of 166 g. (1.0 mole) of 2,3-dimethoxybenzaldehyde, 82.5 g. (1.1 mole) of nitroethane, 200 ml. of toluene, and 20 ml. of n-butylamine is heated at the reflux temperature. The distillate is passed through a separator whereby the lower water layer is removed and only the organic layer is returned to the reaction vessel. After approximately eighteen hours, the expected amount of water has separated. The solution is concentrated to a volume of approximately 200 ml. under reduced pressure. The solution is chilled to about 0° C., and the resulting crystals of 1-(2-nitropropenyl)-2,3-dimethoxybenzene are collected by filtration. Yield 154 g.; M.P. 79–81° C.

In a similar manner to the above, but using 98 g. of 1-nitropropane, 113 g. of 1-nitrobutane or 129 g. of 1-nitropentane in place of 1-nitropropane there is obtained respectively 1-(2-nitro-1-pentenyl)-2,3-dimethoxybenzene of 1-(2-nitro-1-hexenyl)-2,3-dimethoxybenzene.

EXAMPLE 2

1-(2-Nitropropenyl)-2,3-Diethoxybenzene

A mixture of 194 g. (1.0 mole) of 2,3-diethoxybenzaldehyde, 82.5 g. (1.1 mole) of nitroethane, 200 ml. of toluene, and 20 ml. of n-butylamine is heated at the reflux temperature. The distillate is passed through a separator whereby the lower water layer is removed and only the organic layer is returned to the reaction vessel. The reaction is continued until approximately 18 ml. (1 mole) of water has formed. The solution is then concentrated under reduced pressure to remove toluene and butylamine, leaving a residue of substantially pure 1-(2-nitropropenyl)-2,3-diethoxybenzene.

In a similar manner to the above, but using 98 g. of 1-nitropropane, 113 g. of 1-nitrobutane or 120 g. of 1-nitropentane one obtains respectively, 1-(2-nitro-1-butenyl)-2,3-diethoxybenzene, 1-(2-nitro-1-pentenyl)-2,3-diethoxybenzene, or 1-(2-nitro-1-hexenyl)-2,3-diethoxybenzene.

EXAMPLE 3

1-(2,3-Dimethoxyphenyl)-2-Propanone

In a 2-liter creased (Morton) flask are combined 150 g. (0.67 mole) of 1-(2-nitropropenyl)-2,3-dimethoxybenzene, prepared as in Example 1, 260 g. of iron powder (40 mesh), 2.6 g. of ferric chloride hexahydrate and 515 ml. of water. With good stirring the mixture is heated to the reflux temperature. During the course of the next two hours, there is added 260 ml. of 38% aqueous hydrochloric acid, while the mixture is stirred and heated under reflux. The mixture is stirred and heated for 4.5 hours further under reflux. The mixture is cooled to about 20° C., and filtered through a pad of diatomaceous earth. The aqueous filtrate is acidified with 2.5 N hydrochloric acid to a pH of approximately 2. The filter cake is washed successively with four 135-ml. portions of benzene, and each portion is used to extract the aqueous filtrate. The combined organic layers are washed to neutrality with four 150 ml. portions of water. The organic layer is then stirred well with 330 ml. of 10% aqueous sodium bisulfite for an hour. The organic phase is separated and washed with seven 150 ml. portions of water. The organic phase is then concentrated to remove benzene, leaving a residue of 122.2 g. of substantially pure 1-(2,3-dimethoxyphenyl)-2-propanone.

By use of the above procedure, but with replacement of the 1-(2-nitropropenyl)-2,3-dimethoxybenzene by 0.67 gram mole of 1-(2-nitro-1-butenyl)-2,3-dimethoxybenzene, 1-(2-nitro-1-phentenyl)-2,3-dimethoxybenzene, 1-(2-nitro-1-hexenyl)-2,3-dimethoxybenzene, all prepared as in Example 1, or by 2,3-diethoxy-1-(2-nitropropenyl)-benzene, 1,2-diethoxy-3-(2-nitrobutenyl)benzene, 1,2-diethoxy-3-(2-nitropentyl)benzene, or 1,2-diethoxy-3-(2-nitrohexenyl)benzene, all prepared as in Example 2, there is obtained respectively, 1-(2,3-dimethoxyphenyl)-2-butanone, 1-(2,3-dimethoxyphenyl)-2-pentanone, 1-(2,3-dimethoxyphenyl)-2-hexanone, 1-(2,3-diethoxyphenyl)-2-propanone, 1-(2,3-diethoxyphenyl)-2-butanone, 1-(2,3-diethoxyphenyl)-2-pentanone or 1-(2,3-diethoxyphenyl)-2-hexanone.

EXAMPLE 4

5-Methyl-5-(2,3-Dimethoxyphenyl)Hydantoin

A mixture of 37 g. (0.19 mole) of 1-(2,3-dimethoxyphenyl)-2-propanone, prepared as in Example 3, 150 g. of ammonium carbonate, 32.6 g. of potassium cyanide, 225 ml. of absolute ethanol and 225 ml. of water is stirred at room temperature for about 65 hours, then heated at 55–60° C. for two hours. The mixture is then concentrated to approximately half its volume under reduced pressure and the resulting suspension of crystals of 5-methyl-5-(2,3-dimethoxyphenyl)hydantoin after cooling to room temperature is filtered. The product is washed with water and ether and when dry, weighs 46.2 g. (91%), M.P. 199–201° C.

By following the above procedure, but using in place of 1-(2,3-dimethoxyphenyl)-2-propanone, 0.19 gram-mole of
1-(2,3-dimethoxyphenyl)-2-butanone,
1-(2,3-dimethoxyphenyl)-2-pentanone,
1-(2,3-dimethoxyphenyl)-2-hexanone,
1-(2,3-diethoxyphenyl)-2-propanone,
1-(2,3-diethoxyphenyl)-2-butanone,
1-(2,3-diethoxyphenyl)-2-pentanone or
1-(2,3-diethoxyphenyl)-2-hexanone,
one obtains respectively,
5-ethyl-5-(2,3-dimethoxyphenyl)hydantoin,
5-n-propyl-5-(2,3-dimethoxyphenyl)hydantoin,
5-n-butyl-5-(2,3-dimethoxyphenyl)hydantoin,
5-methyl-5-(2,3-diethoxyphenyl)hydantoin,
5-ethyl-5-(2,3-diethoxyphenyl)hydantoin,
5-n-propyl-5-(2,3-diethoxyphenyl)hydantoin, or
5-n-butyl-5-(2,3-diethoxyphenyl)hydantoin.

EXAMPLE 5

α-Methyl-β-(2,3-Dihydroxyphenyl)Alanine

A mixture of 20 g. (0.0756 moles) of 5-methyl-5-(2,3-dimethoxyphenyl)hydantoin (IV) and 200 ml. of 48% aqueous hydrobromic acid was refluxed under a nitrogen atmosphere for 44 hours. The hydrobromic acid was evaporated in vacuo. The residue was dissolved in 50 ml. of tert.-butanol, heated to 60° C. for about 20 minutes, and the tert.-butanol evaporated in vacuo. The residue was then stirred for about 20 minutes in 100 ml. of acetone and the insoluble material removed by filtration. The α-methyl-β-(2,3-dihydroxyphenyl)alanine hydrobromide in solution was converted to the free amino acid by adding 4.9 ml. of ethylene oxide and allowing the mixture to stand at 5° C. for about 16 hours. The crude α-methyl-β-(2,3-dihydroxyphenyl)alanine was filtered, washed with two 10-ml. portions of acetone, and air dried. Yield 13.1 g. (82%). The crude product was slurried in 75 ml. of water. Sulfur dioxide was passed into the solution until a clear solution was obtained. The clear solution was decolorized with one gram of "Darco G–60" charcoal at room temperature for 15 minutes, the charcoal filtered, and the solution concentrated in vacuo to a volume of approximately 50 ml. The mixture was allowed to stand for about 15 hours at 5° C., resulting in the crystallization of α-methyl-β-(2,3-dihydroxyphenyl)alanine. The product was filtered, washed with two 10-ml. portions of ice water, and dried at 100° C. in vacuo. Yield 8.3 g. (52%); M.P. 248° C., resolidified on further heating, solid at 300° C. Concentration of the mother liquors to about 10 ml. followed by cooling gave a second crop; yield 3.56 g. (22%). Each crop was recrystallized by dissolving in about 10 ml. of water saturated with sulfur dioxide per gram of solid, and treating successively with about 10% of "Darco–G–60" and about 5% of ethylene diamine tetraacetic acid tetrasodium salt (each based on the weight of product) and concentrated in vacuo to about 5 ml. per gram. Each of the concentrated solutions was allowed to stand at 5° C. for about 15 hours, causing precipitation of crystalline α-methyl-β-(2,3-dihydroxyphenyl)alanine. Yield 7.82 g., sinter at 249° C. (solid at 300° C.); 2.2 g., sinter at 250° C. (solid at 300° C.), respectively.

EXAMPLE 6

α-Methyl-β-(2,3-Dimethoxyphenyl)Alanine

A mixture of 26.4 g. (0.1 mole) of 5-methyl-5-(2,3-dimethoxyphenyl)hydantoin, prepared as in Example 4, 140 g. of barium hydroxide octahydrate and 700 ml. of water is heated under reflux which efficient stirring for 88.5 hours, thus forming the barium salt of α-methyl-β-(2,3-dimethoxyphenyl)alanine. Carbon dioxide is then bubbled through the mixture until the precipitation of barium carbonate is essentially complete and the suspension is filtered. To the filtrate is added carefully 2 N sulfuric acid until no more barium sulfate precipitates. The final pH is approximately 7. The barium sulfate is removed by filtration and the filtrate is concentrated to give a crystalline residue weighing 31.1 g., M.P. 234–238° C. Residual water is removed by adding successive 50 ml. portions of absolute ethanol and codistilling. The crystalline residue, weighing 25.7 g., is slurried in 250 ml. of boiling absolute ethanol, and after cooling to room temperature, the crystalline product α-methyl-β-(2,3-dimethoxyphenyl)alanine, is collected, washed with cold absolute alcohol, and dried at 100° C. in vacuo; weight, 18.9 g. (79%); M.P. 238.5–240° C.

EXAMPLE 7

α-Ethyl-β-(2,3-Dimethoxyphenyl)Alanine

A mixture of 9.3 g. (0.033 mole) of 5-ethyl-5-(2,3-dimethoxybenzyl)hydantoin, 46.5 g. of barium hydroxide, and 232 ml. of water is heated in a bomb with agitation at 150° C. for 14 hours. The bomb contents are cooled to room temperature and transferred to a flask. Carbon dioxide is bubbled into the reaction mixture until no more barium carbonate precipitates. The mixture is filtered, and 2 N sulfuric acid is added to the filtrate until no more barium sulfate precipitates. The mixture is again filtered and the filtrate concentrated to dryness. The solid material, which has a weight of about 8.3 g., is suspended in 25 ml. of absolute ethanol, and the suspension is cooled and filtered. The solid dl-α-ethyl-β-(2,3-dimethoxyphenyl)alanine is washed with cold ethanol and ether and dried.

By use of the above procedure, but with replacement of the 5-ethyl-5-(2,3-dimethoxybenzyl)hydantoin by 0.033 mole of 5-n-propyl-5-(2,3-dimethoxybenzyl)hydantoin,
5-n-butyl-5-(2,3-dimethoxybenzyl)hydantoin,
5-methyl-5-(2,3-diethoxybenzyl)hydantoin,
5-ethyl-5-(2,3-diethoxybenzyl)hydantoin,
5-n-propyl-5-(2,3-diethoxybenzyl)hydantoin, or
5-n-butyl-5-(2,3-diethoxybenzyl)hydantoin,
one obtains respectively
α-ethyl-β-(2,3-dimethoxyphenyl)alanine,
α-n-propyl-β-(2,3-dimethoxyphenyl)alanine,
α-n-butyl-β-(2,3-dimethoxyphenyl)alanine,
α-methyl-β-(2,3-diethoxyphenyl)alanine,
α-ethyl-β-(2,3-diethoxyphenyl)alanine,
α-n-propyl-β-(2,3-diethoxyphenyl)alanine, or
α-n-butyl-β-(2,3-diethoxyphenyl)alanine.

EXAMPLE 8

3-Amino-3-Methyl-8-Hydroxy-3,4-Dihydrocoumarin Hydrobromide

A mixture of 30.0 g. of α-methyl-β-(2,3-dimethoxyphenyl)alanine and 300 ml. of 48% hydrobromic acid was purged with nitrogen, and refluxed for 2.5 hours, cooled, allowed to stand at room temperature for about 16 hours under a nitrogen atmosphere, and concentrated to dryness in vacuo. The crystalline residue was dissolved in 100 ml. of tert.-butanol, which was evaporated in vacuo; this procedure was repeated twice. The final residue was slurried in 100 ml. of hot acetone to dissolve impurities, and the slurry was cooled and filtered, yielding 3-amino-3-methyl-8-hydroxy-3,4-dihydrocoumarin hydrobromide. Yield 28.8 g. (84%); equivalent weight 276 (theoretical 274).

Analysis for Br: Calculated, 29.17%; found, 28.99%.

In a second run the reflux time was 22.5 hours and the product was recovered in the same manner as in Example 8 except that the extraction with acetone was omitted. A crystalline product consisting essentially of 3-amino-3-methyl-8-hydroxy-3,4-dihydrocoumarin was obtained.

Reaction of α-methyl-β-(3,4-diethoxyphenyl)-alanine according to the procedure of Example 7 results in the formaion of 3-amino-3-methyl-8-hydroxy-3,4-dihydrocoumarin.

Reaction of α-ethyl-β-(3,4-dimethoxyphenyl)-alanine or α-propyl-β-(3,4-dimethoxyphenyl)alanine according to the procedure of Example 7 results in the formation of 3-amino-3-ethyl-8-hydroxy-3,4-dihydrocoumarin or 3-amino-3-propyl-8-hydroxy-3,4-dihydrocoumarin, respectively.

EXAMPLE 9

3-Amino-3-Methyl-8-Hydroxy-3,4-Dihydrocoumarin

One gram of 3-amino-3-methyl-8-hydroxy-3,4-dihydrocoumarin hydrobromide was dissolved in 15 ml. of water and the pH was adjusted to 7.6 with 6 N ammonium hydroxide, the precipitate was filtered, washed with water, and dried in vacuo. This precipitate was identified as 3-amino-3-methyl-8-hydroxy-3,4-dihydrocoumarin (VII). Yield 400 mg. (57%). The product sintered at 225° C. and underwent incomplete decomposition from 225° to 300° C. λ max. 278 mμ, E percent 132.

Analysis.—Calculated for $C_{10}H_{11}O_3N$: C, 62.16%; H, 5.74%. Found: C, 61.98%; H, 6.00%.

EXAMPLE 10

3-Amino-3-Methyl-8-Hydroxy-3,4-Dihydrocoumarin

To a solution of 19.4 g. of sodium bicarbonate in 120 ml. of water was added 19.4 g. (0.071 mole) of 3-amino-3-methyl-8-hydroxy-3,4-dihydrocoumarin hydrobromide in small amounts at a time, causing vigorous foaming of the reaction mixture. The reaction mixture was filtered, and the solid material was washed with water and petroleum ether, and dried in vacuo at 55° C. Yield 12.3 g. (90%); sinter at 220°–222° C. One gram of the crude product was dissolved in 100 ml. of acetonitrile and refluxed. The insoluble material was filtered off, and the reaction mixture was cooled, filtered, and washed with acetonitrile and ether. Yield 740 g., M.P. 229°–230° C. (partial melting).

Analysis.—Calculated for $C_{10}H_{12}NO_3$; C, 62.16%; H, 5.76%; N, 7.25%. Found: C, 62.25%; H, 6.00%, N, 7.52%.

EXAMPLE 11

3-Acetamido-3-Methyl-8-Acetoxy-3,4-Dihydrocoumarin and N-Acetyl-α-Methyl-β-(2,3-Diacetoxyphenyl)Alanine A mixture of 1.5 g. of α-methyl-β-(2,3-dihydroxyphenyl)alanine, 10 ml. of acetic anhydride, and 8 ml. of pyridine was heated at 90° C. for two hours, effecting complete solution. This solution was concentrated to dryness. The residue was dissolved in 5 ml. of water and the solution was acidified to a pH of about 2 with 2.5 N hydrochloric acid. The resulting precipitate was filtered, washed with water and dried. Yield 1.33 g. Recrystallization from hot isopropanol yielded pure 3-acetamido-3-methyl-8-acetoxy-3,4-dihydrocoumarin; M.P. 185°–187.5° C. The infrared spectrum and nuclear magnetic resonance data are consistent with structure.

Analysis.—Calculated for $C_{14}H_{15}O_5N$: C, 60.64%; H, 5.45%; N, 5.05%. Found: C, 60.55%; H, 5.53%; N, 4.85%.

Concentration of the mother liquors gave a second compound, M.P. 207.5°–209° C., λ max. ("Nujol") 5.66μ, 5.8μ, 6.42μ. This compound was identified as N-acetyl-α-methyl-β-(2,3-diacetoxyphenyl)alanine.

We claim:
1. A compound selected from the group consisting of (1) a compound of the formula:

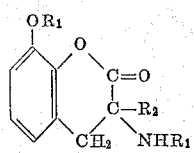

where $R_1$ is selected from the groups consisting of hydrogen and lower alkanoyl, and $R_2$ is straight chain lower alkyl, and (2) a non-toxic acid addition salt thereof.

2. 3-methyl-3-amino-8-hydroxy-3,4-dihydrocoumarin.

References Cited in the file of this patent

UNITED STATES PATENTS 3,049,550    Spencer et al. _____ Aug. 14, 1962